April 19, 1927.  W. J. BEISEL  1,625,518

SPRING WHEEL

Filed Dec. 27, 1922  3 Sheets-Sheet 1

Inventor
Wm. J. Beisel

By Watson, Coit, Morse & Grindle
Attorney

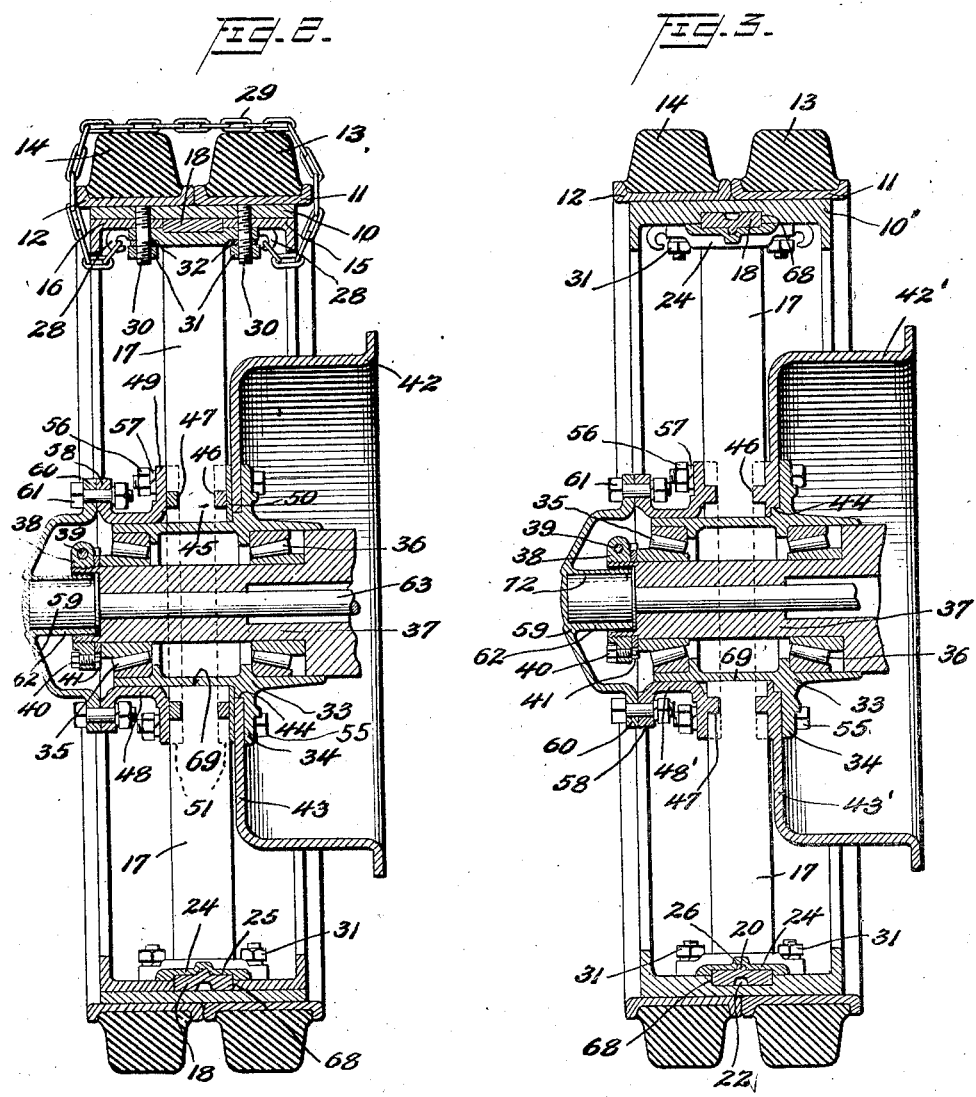

April 19, 1927.  W. J. BEISEL  1,625,518
SPRING WHEEL
Filed Dec. 27, 1922   3 Sheets-Sheet 3
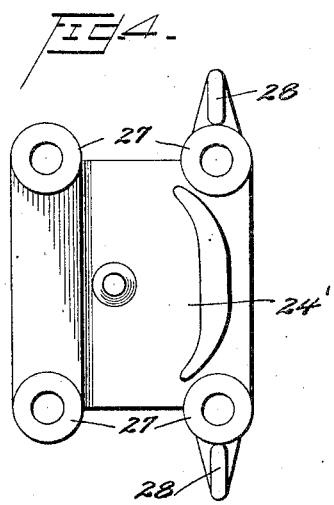
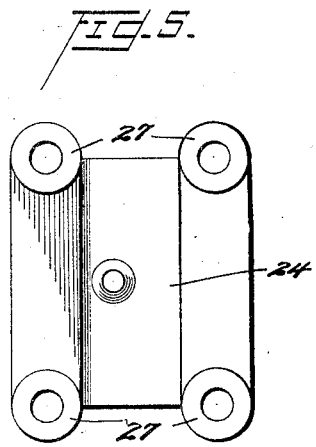
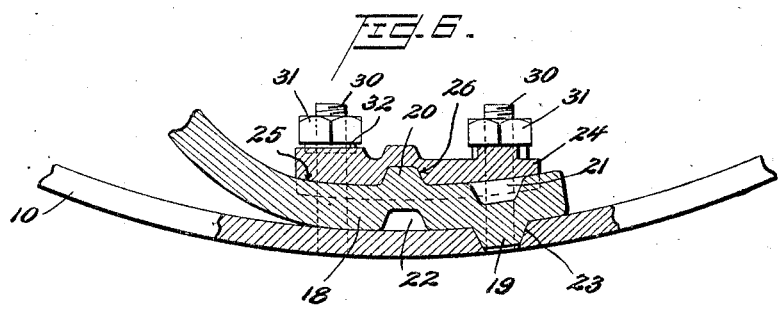
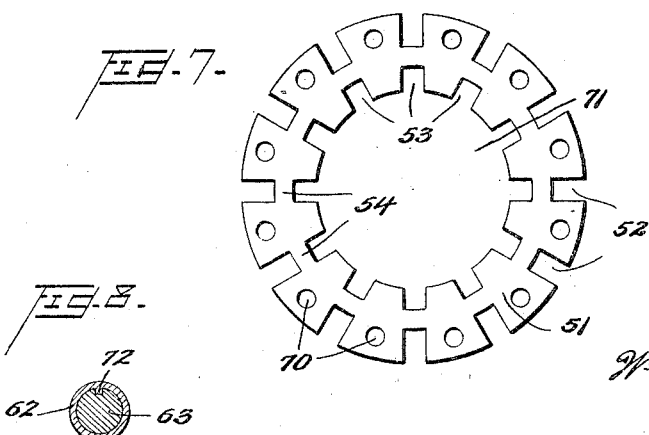
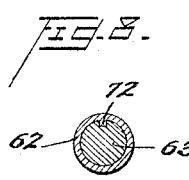

Patented Apr. 19, 1927.

1,625,518

UNITED STATES PATENT OFFICE.

WILLIAM JAKOB BEISEL, OF PORT RICHMOND, NEW YORK, ASSIGNOR TO BEISEL SPRING WHEEL CORPORATION, OF NEW YORK, N. Y., A CORPORATION OF NEW YORK.

SPRING WHEEL.

Application filed December 27, 1922. Serial No. 609,298.

This invention relates to spring wheels adapted for use on vehicles of various kinds. It embodies certain novel structural features and combinations of parts which were intended to produce and which have been found in actual use to be adapted to produce a spring wheel free from many of the defects and objectionable features and characteristics of the various types of spring wheels heretofore produced and which has many very great advantages over such prior spring wheels. It makes possible a spring wheel for any type of vehicle whether light like some pleasure vehicles or heavy like a truck adapted to carry heavy loads in which the center line of the hub will be maintained substantially concentric with the felloe or rim at all times under normal load but which will yield amply to avoid shock on sudden upward movement of the felloe as in moving over an obstruction in the roadway thus avoiding sudden strains on the axle and other parts of the vehicle and contributing to the comfort of those riding in the vehicle. It not only maintains the hub and its axle normally concentric with the rim instead of sagging down below the center, thus saving greatly in the motive power necessary in propelling the vehicle but when used on the rear drive wheels of a vehicle it avoids shock and resulting injury to the drive mechanism of the vehicle and slippage of the wheels on the roadbed since the springs will yield and permit slight relative turning between the axle and felloe resulting in shock absorption. It will absorb the maximum torque of the engine when suddenly applied temporarily and then apply the stored power to turn the wheel on the roadbed without increasing the torque on the engine suddenly. This also tends to prevent slipping of the clutch in starting or making connection. The sagging of the hub or axle below the center of the wheel is a very serious matter since the effect on the motor is like that of continually pulling up a rather steep hill but it has been found impossible heretofore to avoid it while securing anything like the desired resiliency in the wheel.

The above noted novel features and advantages of the present invention are due largely to a novel longitudinal shape or design of the spring spokes, a novel rim structure and clamping means for rigidly connecting the outer ends of the spokes thereto and novel structural arrangement for securing the inner ends to the hub. The particular longitudinal form or curvature of the spokes as viewed from the side is illustrated in Figure 1. For convenience of reference this form of spoke will be referred to as sickle shape or as a sickle spoke. I have found that this form of spring spoke will yield as freely, accurately and satisfactorily when under the special strains to which it is subjected when occupying a horizontal or nearly horizontal position as when it is vertical and subjected to vertical strains and this causes what may be called a continuous flow of flexibility in all the spokes when in use. This is believed to be new.

Another novel and very useful and advantageous feature of the invention consists in the structure of the felloe and the cooperating means for securing the outer ends of the spokes to it which makes the felloe exceedingly strong and rigid by the use of a minimum amount of material and which cooperates with the clamping means rigidly connected to it to entirely enclose and tightly clamp the spokes with an interlock from their outer ends to a point a material distance therefrom where they bend inwardly thus preventing the slightest relative movement of the outer ends of the spokes with reference to the felloe, either lateral or longitudinal. Still another very important structural combination included in the invention resides in the means by which the radial inner end portions of the spokes are connected to the hub and rigidly engaged and held along their edges from their inner end outward for a material distance preventing any possible movement with reference to the hub, either radial, peripheral or lateral. The complete wheel embodying the hub, spokes and felloe includes no loose parts or any likely to become loose from use and includes no relatively moving surfaces in contact and thus it is free from the rattling and squeaking noise under the strains of use which are common with most spring wheels. The form of the spokes, their long rigid surface contact connection with the hub and felloe and the peculiarly strong construction of the felloe serve to make the wheel not only very strong and lasting but enable it to withstand without injury or appreciable lateral yielding the side strains, such for instance as those which are produced by a transversely inclined road bed, particularly under heavy loads. The novel features of the invention will be more fully understood from the following description and claims taken with the accompanying drawings:

In the drawings—

Fig. 2 is a vertical section on line 2—2 of Fig. 1 looking to the left, this figure showing a skid chain which does not appear in Figure 1;

Fig. 3 is a similar vertical section showing a modified arrangement of some of the parts;

Fig. 4 is a detached plan view of one of the caps for the outer ends of the spokes including hooks for tire chains;

Fig. 5 is a plan view of a similar cap not having the hoops;

Fig. 6 is an enlarged longitudinal section of a part of the felloe and the end of a spoke and its clamp assembled;

Fig. 7 is a side view of one of the disks used on the hub to engage the edges of the spokes; and Fig. 8 is a cross section through the end of the drive axle showing its key connection to the hub cap.

Figure 1:
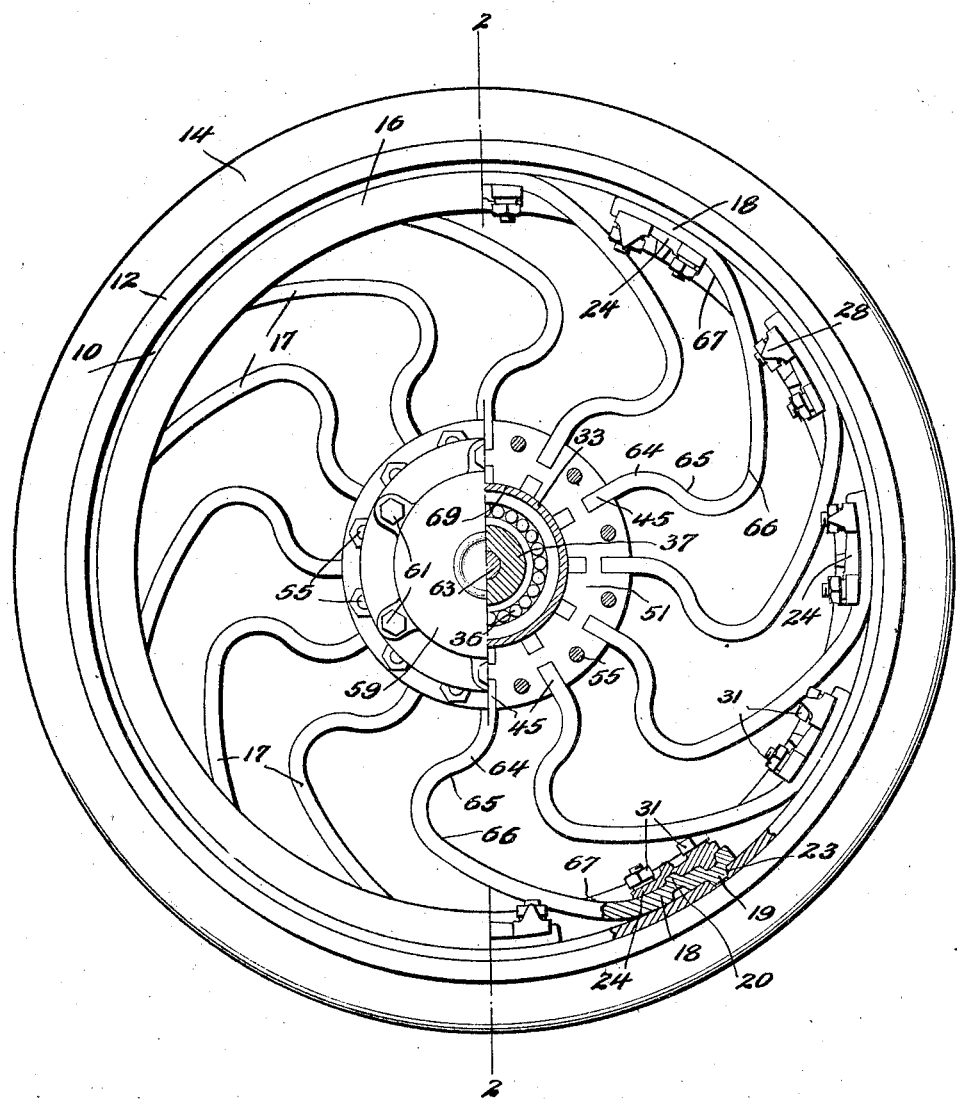
Fig. 1 is a side view, partly in section, of a wheel embodying my invention.

The embodiment of the invention shown for the purpose of illustration consists in a rear drive wheel such as are used on heavy trucks although as heretofore stated it is applicable to various kinds of wheels. The felloe of the wheel consists of a continuous cylindrical ring 10 shown as sufficiently wide to receive on its outer surface two rims 11 and 12 carrying the rubber tires 13 and 14. Closely fitting the inner surface of the felloe 10 are continuous rings 15 and 16 which are L-shaped in cross section with one flange of each extending radially inward at one edge of the felloe, its outer surface being in the same radial plane as the edge of the felloe. The inner edges of the flanges of these L-shaped rings which fit the inner surface of the felloe are spaced apart a distance equal to the width of the spring spokes which will be described so that there is what may be called a groove 68 centrally arranged on the inner face of the felloe adapted to receive the spoke. These L-shaped rings are preferably assembled with the felloe under tension so that the joint will be tight.

As will be seen by reference to Figs. 1 and 6, the spokes 17 consist of strong metal strips of uniform width and thickness which are longitudinally curved to have outer end portions 18 closely fitting the inner face of the felloe 10 in the groove 68 formed between the edges of the rings 15 and 16 but the thickness of the spoke is greater than is the depth of this groove and thus the inner portion of the spoke projects inwardly from the surface of the flanges of rings 15 and 16. The end portion 18 of each spoke has formed from it comparatively small radial projections 19 and 20, spaced longitudinally around the wheel and of slightly conical form produced by punching the metal forming opposite depressions 21 and 22. The felloe 10 has conical openings or depressions 23 corresponding to the projections 19 on the spoke ends and those projections fit in these depressions when the parts are assembled as shown in Figs. 1 and 6. A clamping cap 24 which is somewhat wider than the spoke end has an outer face longitudinally curved concentrically of the wheel and having in it a longitudinal groove 25 similarly curved, the width of this groove being such as to closely fit the sides of the inwardly projecting part of the portion 18 of the spoke but its depth being slightly less than the distance the portion 18 projects inwardly beyond the surfaces of the flanges of rings 15 and 16 so that the bottom of the groove may make clamping contact with the spoke end when pressed outward. Each cap 24 has a socket or depression 26 which is conical in form and in which the inward projection 20 on the spoke end fits. At the corners of each cap 24 there are rounded projections 27 which have radial openings through them for bolts and in the form shown in Fig. 4 the caps 24' are provided on opposite sides with tapering hooks 28 each of which projects outwardly and is curved in towards the center of the wheel and then back towards the cap and its free end is so near the line of the opening through the corner projection that a nut on a bolt in that opening will prevent the accidental disengagement of a tire chain 29 engaged by that hook. In assembling a wheel some caps without hooks as shown in Figure 5, may be employed if desired.

Four screw threaded bolts 30 pass through and are rigidly connected to the felloe 10 at their outer ends and then through the flanges of the rings 15 and 16 and through the corner openings on the cap 24 or 24', and nuts 31 provided with lock washers 32 engage the screw threaded inner ends of these bolts and the outer face of the cap and clamp the cap and spoke end rigidly to the felloe. It will be noted that the caps 24 and 24' extend substantially throughout the length of the end portion 18 of the spoke which fits the felloe and since that portion is of material length, the clamping action will make a very rigid connection with practically no possibility of the development of looseness because of the comparatively long leverage in the joint resisting relative bending movement.

The hub 33 is hollow and has a cylindrical outer surface 69 and an integral radial flange 34 near one end. This hub is mounted on roller bearings 35 and 36 which in turn are mounted on the outer end portion 37 of the axle housing so that the wheel may turn on that fixed support. A lock nut 38 on the outer end of the portion 37 beyond roller bearing 35 serves to hold the roller bearings and the hub on member 37 and it is used to adjust the bearings and it includes the locking bolt 39 and cap screw 40 to lock the lock washer 41 in position after it is adjusted as is well known in the art. A brake drum 42 surrounds the inner end portion of the hub and its inturned end wall 43 fits the inner face of the integral flange 34 and its inner edge may fit a shoulder 44 near the inner or base portion of flange 34.

It will be seen by reference to Figs. 1 and 2 that each spoke has an inner end portion 45 at the hub in a radial plane and this portion is provided with rectangular notches 46 and 47 between its ends on opposite sides. The means for securing these inner end portions of the spokes to the hub include a short cylindrical member 48 slidable on the hub 33 from its outer end towards the integral flange 34 and having at its inner edge the integral radial flange 49. A thin circular disk 50 having a central opening slidably fitting on the outer surface of the hub is moved inwardly from the end until it lies close against the inner face of the end wall of the brake drum and it has a diameter equal to that of flange 49 and its purpose is to space the edges of the spokes from the end wall of the brake drum so as to prevent the outer portions of the spokes from making contact with the brake drum in use and when bending. A pair of circular disks one of which is shown in Fig. 7 are used at the edges of the inner end portions of the spokes to hold them in place on the hub between flanges 34 and 49. These disks are identical and have bolt holes 70 and a central opening 71 which adapts them to slidably fit on the hub to move to position and have radial slots extending from the inner and outer edges in aligned pairs 52 and 53, leaving a solid portion 54 of the disk between their adjacent ends. These slots have a width equal to the thickness of the spokes and the solid connecting part 54 is of such size as to closely fit in the notches 46 and 47 in the sides of the inner end portions of the spokes. One of these disks fits against the spacer disk 50 with the inner edges of the spokes in its radial slots and its portions 54 in the notches in the spokes. The other disk lies against the inner face of flange 49 and similarly engages the outer edges of the spokes. A plurality of bolts 55 pass through integral flange 34, the inner wall 43 of the brake drum, spacer disk 50 and the two disks 51 and through flange 49 on the cylindrical portion 48 and have screw threaded ends engaged by nuts 56, having lock washers 57. By tightening up the connection by turning the nuts on these bolts to the desired extent, it will be seen that the inner ends of the spokes are rigidly connected together and to the hub along their edge portions from the hub outwardly to the margin of the flanges 34 and 49.

The cylindrical member 48 has at its outer end a peripheral flange 58 and there is a cap 59 having a peripheral flange 60 fitting said flange 58 and secured to it by bolts 61. This cap 59 encloses the outer end of the axle and at its central portion 62 has a key 72 for rotatively engaging the end of the drive axle 63 which extends through the housing 37 and is driven from the usual differential as is well known in the art.

As heretofore stated the longitudinal curvature or form of the spring spoke constitutes a very important element in the present invention. As will be seen by reference to Fig. 1, each spoke has an inner end portion 45 which is on a radial plane through the center of the hub and most of this radial portion is clamped securely at the hub as indicated above but a short distance outwardly from the outer edge of the flanges 34 and 49 at 64 the spoke curves laterally of the radial plane substantially on the arc of a circle having a comparatively small radius to the points 65, where it commences to curve in the opposite direction on the arc of a circle for the inner concave face which has substantially the same radius as that of the convex surface between 64 and 65 and at the point 66 the reverse curve is continued but on a very much greater radius until the point 67 is reached near the inner surface of the felloe. At this point there is a short curve on a short radius connecting the section between 66 and 67 to the end portion 18 heretofore described which fits the felloe. It will be noted that there are twelve spokes in the wheel shown and that a radial plane through the inner radial end of one spoke will pass through the outer end portion 18 of an adjacent spoke and that the outer curved portion between 66 and 67 is at only a slight angle to radial planes and extends throughout about 30° around the circumference. I have found that this particular sickle shaped spoke has very decided advantages over any previously used form of spring spoke, although it resembles somewhat in appearance the scythe form of spoke covered by prior patents granted to me.

When the spokes are brought into substantially the longitudinal shape shown and they are properly tempered by heat treatment, the curvature is such that the outer surface of the end portion 18 which fits the felloe is at a slightly greater distance from the inner end of the radial portion at the hub than it is when assembled in the wheel so that the spokes when assembled in the wheel will be under a predetermined degree of tension tending to expand longitudinally. This aids in maintaining the hub at the center of the wheel in use. It will, of course, be understood that the spokes may be of any desired thickness, width or length to suit special conditions and that the invention is not limited to the use of a single layer in each spoke.

As heretofore stated, a spoke of this form when properly designed for the load to be carried will maintain the hub substantially concentric with the felloe at all times under normal load but under sudden upward movement of the felloe will yield sufficiently to give that resiliency desired to the wheel.

It will, of course, be understood that the invention is not limited to the particular structural arrangement shown and described beyond what is called for in the claims. For instance, the L-shaped rings 15 and 16 may be welded to or formed integral with the felloe band 10' if desired, as shown in Fig. 3. One of the disks 51 for engaging the edges of the ends of the spokes at the hub may be made integral with flange 49 on the short cylindrical portion 48' which, of course, means that the inner face of that flange would have a series of grooves in it corresponding in size and depth to the width of the slots in the disk and the thickness of the disk and this also is illustrated in Fig. 3. The other disk 51 may be made integral with the spacer disk 50, and with the inner portion of the end wall 43' of the brake drum 42', as shown in Fig. 3.

Having thus described the invention, what is claimed as new and desired to be secured by Letters Patent is:

1. A spring wheel comprising in combination, a hub, a metal felloe, a plurality of sickle shaped spring spokes having radial inner ends secured to the hub and outer ends extending along the inner face of said felloe, the said inner face having a central groove like radial depression in which the outer ends of the spokes fit longitudinally and caps extending across said ends bolted to the felloe, thus rigidly clamping the outer spoke ends to the felloe.

2. A spring wheel comprising in combination, a hub, a metal felloe, a plurality of sickle shaped spring spokes having radial inner ends secured to the hub and outer ends extending along the inner face of said felloe, the said inner face having a central groove like radial depression in which the outer ends of the spokes fit longitudinally and caps extending across said ends bolted to the felloe on both sides of said ends thus rigidly clamping the outer spoke ends to the felloe, the radial contact surfaces of said end, cap and felloe having corresponding interlocking radial depressions and elevations.

3. A spring wheel comprising in combination, a hub, a metal felloe, a plurality of sickle shaped spring spokes having radial inner ends secured to the hub and outer ends extending along the inner face of said felloe, the said inner face having a central groove like radial depression in which the outer ends of the spokes fit longitudinally and marginal inwardly extending flanges and caps extending across said ends bolted to the felloe between said flanges and depression thus rigidly clamping the outer spoke ends to the felloe.

4. A spring wheel comprising in combination, a hub, a metal felloe in the form of a continuous cylindrical band of substantially uniform thickness, rings L-shaped in section tightly fitting in said felloe band from its edges inward, providing radial inwardly extending flanges at the edges of the felloe band and a central channel or groove between the adjacent edges of the flanges which fit the inner surface of the band, a plurality of sickle shaped spring spokes having radial inner ends secured to the hub, and outer end portions fitting closely in said channel or groove and the inner surface of said felloe band, a cap for clamping each of said end portions in place extending across and along it and bolts having lock nuts connected to said felloe extending through said caps at the sides of said spoke end for rigidly holding said caps in place.

5. A spring wheel comprising in combination, a hub, a metal felloe in the form of a continuous cylindrical band of substantially uniform thickness, rings L-shaped in section tightly fitting in said felloe band from its edges inward, providing radial inwardly extending flanges at the edges of the felloe band and a central channel or groove between the adjacent edges of the flanges which fit the inner surface of the band, a plurality of sickle shaped spring spokes having radial inner ends secured to the hub, and outer end portions having a thickness greater than the depth of said groove, and fitting closely in it against the inner surface of the felloe band, a cap for each of said end portions having a groove or recess on its under side in which the projecting part of said end portion fits, the contacting portions of said cap, spoke end, and felloe band having corresponding interlocking depressions and elevations between their margins and bolts having lock nuts connecting said cap and felloe at the sides of the spring end thus rigidly connecting the spoke end to the felloe.

6. A spring wheel comprising in combination, a hub, a metal felloe having a groove-like depression of uniform width and depth centrally on its inner side, a plurality of longitudinally curved spring spokes secured to the hub at their inner ends and having outer end portions closely fitting in said depression and against the inner surface of the felloe for a material distance longitudinally their thickness being greater than the depth of said groove-like depression, caps for securing said end portions to the felloe of approximately the same length as said portions but wider, having longitudinal grooves fitting said end portions radially and laterally, laterally extended perforated lugs at the corners of said caps, screw threaded bolts secured to said felloe and passing through said perforated lugs, lock nuts on said bolts bearing on said lugs for clamping the caps, spoke ends and felloe rigidly together.

7. A spring wheel comprising in combination a hub, a metal felloe having a groove-like depression of uniform width and depth centrally on its inner side, and inwardly extending marginal flanges, a plurality of longitudinally curved spring spokes secured to the hub at their inner ends and having outer end portions closely fitting in said depression and against the inner surface of the felloe for a material distance longitudinally their thickness being greater than the depth of said groove-like depression, caps for securing said end portions to the felloe of approximately the same length as said portions but wider having longitudinal grooves fitting said end portions radially and laterally, laterally extended perforated lugs at the corners of said caps, screw threaded bolts secured to said felloe and passing through said perforated lugs, lock nuts on said bolts bearing on said lugs for clamping the caps, spoke ends and felloe rigidly together.

8. A spring wheel comprising in combination, a hub, a metal felloe, a plurality of longitudinally curved spring spokes secured to the hub at their inner ends and having outer end portions extending along and closely fitting the central portion of the inner surface of said felloe provided with longitudinally spaced integral projections, one extending outwardly and one inwardly on each spoke and means including caps cooperating with said felloe laterally and radially enclosing and closely fitting said end portions rigidly connecting them to the felloe, the said felloe and caps having depressions in which the projections on said end portion fit.

In testimony whereof I hereunto affix my signature.

WILLIAM JAKOB BEISEL.